US010127566B2

(12) United States Patent
Arora

(10) Patent No.: US 10,127,566 B2
(45) Date of Patent: Nov. 13, 2018

(54) PLATFORMS, SYSTEMS, SOFTWARE, AND METHODS FOR DYNAMIC RECAPTURE OF RETAIL SALES

(75) Inventor: Harsh Arora, Beaverton, OR (US)

(73) Assignee: NOW DISCOUNT LLC, Beaverton, OR (US)

(*) Notice: Subject to any disclaimer, the term of this patent is extended or adjusted under 35 U.S.C. 154(b) by 677 days.

(21) Appl. No.: 13/604,378

(22) Filed: Sep. 5, 2012

(65) Prior Publication Data
US 2014/0067513 A1 Mar. 6, 2014

(51) Int. Cl.
G06Q 30/02 (2012.01)

(52) U.S. Cl.
CPC .................. G06Q 30/02 (2013.01)

(58) Field of Classification Search
None
See application file for complete search history.

(56) References Cited

U.S. PATENT DOCUMENTS

| 7,472,081 | B1 | 12/2008 | Cason |
| 7,653,576 | B2* | 1/2010 | Boss et al. ............. 705/26.62 |
| 7,809,607 | B2 | 10/2010 | Gantman et al. |
| 7,975,917 | B2 | 7/2011 | Clark et al. |
| 2002/0002504 | A1 | 1/2002 | Engel et al. |
| 2002/0046157 | A1 | 4/2002 | Solomon |
| 2002/0049742 | A1 | 4/2002 | Chan et al. |
| 2004/0044627 | A1 | 3/2004 | Russell et al. |
| 2004/0215516 | A1 | 10/2004 | Denoon et al. |
| 2004/0260608 | A1 | 12/2004 | Lewis et al. |
| 2005/0055281 | A1 | 3/2005 | Williams |
| 2005/0160004 | A1* | 7/2005 | Moss et al. .................. 705/14 |
| 2006/0015404 | A1 | 1/2006 | Tran |
| 2006/0100932 | A1 | 5/2006 | Ohmori et al. |
| 2006/0143091 | A1 | 6/2006 | Yuan et al. |
| 2007/0050230 | A1 | 3/2007 | Umagat |
| 2007/0255619 | A1 | 11/2007 | Ekchian |
| 2007/0287416 | A1 | 12/2007 | Ku |
| 2007/0290038 | A1 | 12/2007 | Woodcock et al. |
| 2008/0005104 | A1 | 1/2008 | Flake et al. |
| 2008/0052169 | A1* | 2/2008 | O'Shea et al. ............... 705/14 |
| 2008/0154714 | A1 | 6/2008 | Liu et al. |
| 2008/0183576 | A1 | 7/2008 | Kim et al. |
| 2008/0214166 | A1 | 9/2008 | Ramer et al. |
| 2009/0012803 | A1* | 1/2009 | Bishop et al. ............... 705/1 |
| 2009/0089177 | A1 | 4/2009 | Dayton et al. |
| 2010/0017265 | A1 | 1/2010 | Weingarten et al. |
| 2010/0185504 | A1 | 7/2010 | Rajan et al. |
| 2010/0280960 | A1 | 11/2010 | Ziotopoulos et al. |
| 2010/0312624 | A1 | 12/2010 | Bilenko |
| 2010/0318412 | A1* | 12/2010 | Karypis .............. G06Q 30/02 705/14.1 |
| 2010/0324972 | A1 | 12/2010 | Brooke et al. |
| 2011/0231292 | A1 | 9/2011 | McCown |

(Continued)

OTHER PUBLICATIONS

Josh Leibowitz and Aaron Rettaliata. 'How Retailers Can Win the Mobile Shopper Turf War'. Mar. 5, 2012. Forbes. pp. 1 and 2.*

(Continued)

Primary Examiner — James M Detweiler
(74) Attorney, Agent, or Firm — Wilson Sonsini Goodrich & Rosati

(57) ABSTRACT

Computer-based platforms, systems, software, and methods for dynamic recapture of retail sales in showrooming situations.

27 Claims, 7 Drawing Sheets

(56) References Cited

U.S. PATENT DOCUMENTS

| | | |
|---|---|---|
| 2011/0238474 A1 | 9/2011 | Carr et al. |
| 2011/0270652 A1 | 11/2011 | McAleese et al. |
| 2011/0282747 A1 | 11/2011 | Lavrov et al. |
| 2011/0288922 A1 | 11/2011 | Thomas et al. |
| 2012/0084137 A1 | 4/2012 | Shimogori |
| 2012/0130797 A1 | 5/2012 | Shin |
| 2012/0158482 A1* | 6/2012 | Paradise et al. ........... 705/14.25 |
| 2012/0173351 A1 | 7/2012 | Hanson et al. |
| 2012/0179549 A1 | 7/2012 | Sigmund et al. |
| 2013/0290145 A1* | 10/2013 | Durst, Jr. ............ G06Q 30/0629 705/26.64 |
| 2013/0339113 A1* | 12/2013 | Junger ............... G06Q 30/0211 705/14.13 |

OTHER PUBLICATIONS

George Anderson. "Retailers Fear Becoming Amazon's 'Showroom'". Jul. 14, 2011. Forbes.*

* cited by examiner

PLATFORMS, SYSTEMS, SOFTWARE, AND METHODS FOR DYNAMIC RECAPTURE OF RETAIL SALES

BACKGROUND OF THE INVENTION

The U.S. domestic retail market is massive and intensely competitive with large brick and mortar retailers, aggressive mass merchants, and dominant online players competing for the business of price-savvy customers. An unstable macroeconomic climate has reduced consumer confidence and, hence, their desire to spend. The CE sector, for example, is characterized by additional dynamics including, industry consolidation, compressed product lifecycles, intensified competition from alternative channels, and consumer expectations for aggressive "deals." Combined together, these factors place incredible pressure on physical specialty retailers' revenue and margins.

SUMMARY OF THE INVENTION

"Showrooming" is a recent trend negatively impacting brick and mortar (e.g., physical) specialty retailers. The term showrooming describes the situation where consumers (e.g., shoppers) visit physical retail stores to research and/or learn about a given product, and then buy it online at a lower price than that offered by the physical retail store. Fifteen percent of respondents to a recent survey said they use their mobile phones in physical stores to compare prices to online-only rivals, according to market research firm Forrester Research. It is likely that the trend toward showrooming will grow and probably accelerate in coming years.

Physical retailers have not been able to address the problem of showrooming because it is difficult to identify and isolate potential showroomers, without also providing benefits to those who are neither showrooming nor ever likely to. Specifically, current strategies and solutions have failed to provide answers to the following questions:

How does a retailer positively identify a shopper as a showroomer?

How does a retailer identify exactly when a shopper would be showrooming and for what particular item or items?

How does a retailer identify a price that a showroomer is likely to find online, decide whether it makes sense to match that price and, if so—present that price to only that particular shopper at that particular time?

As consumers continue to shift spending to online retail outlets, physical retailers need tools to counter the shift. Accordingly, provided herein are platforms, systems, software, applications, and methods offering answers to all of the questions above and a palliative to the issue of showrooming for physical retailers. In addition, provided herein are unique tools for consumers, allowing them to effortlessly acquire pricing and service superior to that currently available through either offline or online resources.

In one aspect, disclosed herein are retail sale recapture platforms comprising: a mobile processor configured to provide a mobile application comprising: a software module for allowing a consumer to identify at least one retail item, the at least one retail item within a physical retailer outlet; a software module for identifying the location of the physical retailer outlet; a software module for transmitting retail item and location information to a server application; a server processor configured to provide a server application comprising: a software module for identifying an online price for the at least one retail item; a software module for querying the retailer for an individual price discount on the at least one retail item for the consumer based on the online price; a software module for presenting a price discount to the consumer by the mobile application. In some embodiments, the software module for allowing a consumer to identify at least one retail item identifies an item by one or more of: scanning a bar code, accepting voice input from the consumer, accepting text input from the consumer, capturing a photograph or video, and reading a near field communication (NFC) signal. In further embodiments, the bar code is a Universal Product Code (UPC) code, Quick Response (QR) code, or High Capacity Color Barcode (HCCB). In further embodiments, the NFC signal is an RFID or Bluetooth signal. In some embodiments, the at least one retail item is selected from: consumer electronics, jewelry, watches, automotive parts, automotive accessories, sporting goods, exercise equipment, musical instruments, motorcycles parts, motorcycle accessories, furniture, and mattresses. In some embodiments, the software module for identifying the location of the physical retailer outlet requests location information from a mobile processing device. In further embodiments, the location information is determined by one or more of: GPS, assisted GPS, cell site identification, triangulation, and multilateration, WiFi base station location, IP address, and user input. In some embodiments, the software module for querying a retailer for an individual price discount queries a discount algorithm preconfigured by the retailer. In further embodiments, the discount algorithm comprises: an item, a minimum price, effective dates/times, and effective retailer outlet locations. In some embodiments, the price discount is further based on one or more of: other items identified by the consumer, purchases made by the consumer, price discounts presented to the consumer, price discounts accepted by the consumer, and price discounts rejected by the consumer. In some embodiments, the price discount is further based on one or more of: the retailer's margin on at least one retail item, the retailer's inventory of the at least one retail item, competitor pricing of the at least one retail item, and competitor promotion of the at least one retail item. In some embodiments, the server application further comprises a software module for configuring discount algorithms, the module adapted for use by retailers. In some embodiments, the software module for presenting a price discount to the consumer presents a coupon, coupon code, voucher, or integration with an appropriate back-end retailer process. In further embodiments, the coupon, coupon code, voucher, or integration with an appropriate back-end retailer process is valid for a limited period of time. In some embodiments, a presented price discount is acceptable or rejectable by the consumer. In some embodiments, the server application further comprises a software module for identifying a next closest physical retailer outlet. In further embodiments, the server application further comprises a software module for querying the next closest retailer for an individual price discount on the at least one retail item for the consumer based on the online price. In some embodiments, the platform further comprises a database, in a computer memory, of retailers participating in a retail sale recapture program.

In another aspect, disclosed herein are computer-implemented systems comprising: a mobile digital processing device comprising an operating system configured to perform executable instructions and a memory device; a computer program including instructions executable by the mobile digital processing device to create a mobile retail sale recapture application comprising: a software module configured to allow a consumer to identify at least one retail item, the at least one retail item within a physical retailer outlet; a software module configured to identify the location of the physical retailer outlet; a software module configured to query the retailer for an individual consumer price discount on the at least one retail item based an online price for the at least one retail item; and a software module configured to present a price discount to the consumer. In some embodiments, the software module configured to allow a consumer to identify at least one retail item identifies an item by one or more of: scanning a bar code, accepting voice input from the consumer, accepting text input from the consumer, capturing a photograph or video, and reading a near field communication (NFC) signal. In further embodiments, the bar code is a Universal Product Code (UPC) code, Quick Response (QR) code, or High Capacity Color Barcode (HCCB). In further embodiments, the NFC signal is an RFID or Bluetooth signal. In some embodiments, the at least one retail item is selected from: consumer electronics, jewelry, watches, automotive parts, automotive accessories, sporting goods, exercise equipment, musical instruments, motorcycles parts, motorcycle accessories, furniture, and mattresses. In some embodiments, the software module configured to identify the location of the physical retailer outlet requests location information from a mobile processing device. In further embodiments, the location information is determined by one or more of: GPS, assisted GPS, cell site identification, triangulation, and multilateration, WiFi base station location, IP address, and user input. In some embodiments, the software module configured to query a retailer for an individual consumer price discount queries a discount algorithm preconfigured by the retailer. In further embodiments, the discount algorithm comprises: an item, a minimum price, effective dates/times, and effective retailer outlet locations. In some embodiments, the price discount is further based on one or more of: other items identified by the consumer, purchases made by the consumer, price discounts presented to the consumer, price discounts accepted by the consumer, and price discounts rejected by the consumer. In some embodiments, the price discount is further based on one or more of: the retailer's margin on at least one retail item, the retailer's inventory of the at least one retail item, competitor pricing of the at least one retail item, and competitor promotion of the at least one retail item. In some embodiments, the software module configured to present a price discount to the consumer presents a coupon, coupon code, voucher, or integration with an appropriate back-end retailer process. In further embodiments, the coupon, coupon code, voucher, or integration with an appropriate back-end retailer process is valid for a limited period of time. In some embodiments, wherein a presented price discount is acceptable or rejectable by the consumer. In some embodiments, the application further comprises a software module configured to identify a next closest physical retailer outlet. In further embodiments, the application further comprises a software module configured to query the next closest retailer for an individual consumer price discount on the at least one retail item for the consumer based on the online price. In some embodiments, the application further comprises a database, in a computer memory, of retailers participating in a retail sale recapture program.

In another aspect, disclosed herein are computer-readable storage media encoded with a computer program including instructions executable by a processor to create a retail sale recapture mobile application comprising: a software module configured to allow a consumer to identify at least one retail item, the at least one retail item within a physical retailer outlet; a software module configured to identify the location of the physical retailer outlet; a software module configured to query the retailer for an individual consumer price discount on the at least one retail item based an online price for the at least one retail item; and a software module configured to present a price discount to the consumer. In some embodiments, the software module configured to allow a consumer to identify at least one retail item identifies an item by one or more of: scanning a bar code, accepting voice input from the consumer, accepting text input from the consumer, capturing a photograph or video, and reading a near field communication (NFC) signal. In further embodiments, the bar code is a Universal Product Code (UPC) code, Quick Response (QR) code, or High Capacity Color Barcode (HCCB). In further embodiments, the NFC signal is an RFID or Bluetooth signal. In some embodiments, the at least one retail item is selected from: consumer electronics, jewelry, watches, automotive parts, automotive accessories, sporting goods, exercise equipment, musical instruments, motorcycles parts, motorcycle accessories, furniture, and mattresses. In some embodiments, the software module configured to identify the location of the physical retailer outlet requests location information from a mobile processing device. In further embodiments, the location information is determined by one or more of: GPS, assisted GPS, cell site identification, triangulation, and multilateration, WiFi base station location, IP address, and user input. In some embodiments, the software module configured to query a retailer for an individual consumer price discount queries a discount algorithm preconfigured by the retailer. In further embodiments, the discount algorithm comprises: an item, a minimum price, effective dates/times, and effective retailer outlet locations. In some embodiments, the price discount is further based on one or more of: other items identified by the consumer, purchases made by the consumer, price discounts presented to the consumer, price discounts accepted by the consumer, and price discounts rejected by the consumer. In some embodiments, the price discount is further based on one or more of: the retailer's margin on at least one retail item, the retailer's inventory of the at least one retail item, competitor pricing of the at least one retail item, and competitor promotion of the at least one retail item. In some embodiments, the software module configured to present a price discount to the consumer presents a coupon, coupon code, voucher, or integration with an appropriate back-end retailer process. In further embodiments, the coupon, coupon code, voucher, or integration with an appropriate back-end retailer process is valid for a limited period of time. In some embodiments, a presented price discount is acceptable or rejectable by the consumer. In some embodiments, the application further comprises a software module configured to identify a next closest physical retailer outlet. In further embodiments, the application further comprises a software module configured to query the next closest retailer for an individual consumer price discount on the at least one retail item for the consumer based on the online price. In some embodiments, the application further comprises a database, in a computer memory, of retailers participating in a retail sale recapture program.

In another aspect, disclosed herein are computer-readable storage media encoded with a computer program including instructions executable by a processor to create a retail sale recapture server comprising: a database, in a computer memory, of retailers and retailer locations; a software module configured to receive location information and identify a physical retailer outlet; a software module configured to receive product information and identify at least one retail item; a software module configured to identify an online price for the at least one retail item; a software module configured to query the retailer for an individual consumer price discount on the at least one retail item based on the online price; and a software module configured to present a price discount to a consumer. In some embodiments, the product information is from: scanning a bar code, voice input from a consumer, text input from a consumer, a photograph or video, and a near field communication (NFC) signal. In further embodiments, the bar code is a Universal Product Code (UPC) code, Quick Response (QR) code, or High Capacity Color Barcode (HCCB). In further embodiments, the NFC signal is an RFID or Bluetooth signal. In some embodiments, the at least one retail item is selected from: consumer electronics, jewelry, watches, automotive parts, automotive accessories, sporting goods, exercise equipment, musical instruments, motorcycles parts, motorcycle accessories, furniture, and mattresses. In some embodiments, the location information comprises latitude and longitude or a physical street address. In some embodiments, the software module configured to query a retailer for an individual consumer price discount queries a discount algorithm preconfigured by the retailer. In further embodiments, the discount algorithm comprises: an item, a minimum price, effective dates/times, and effective retailer outlet locations. In some embodiments, the price discount is further based on one or more of: other items identified by the consumer, purchases made by the consumer, price discounts presented to the consumer, price discounts accepted by the consumer, and price discounts rejected by the consumer. In some embodiments, the price discount is further based on one or more of: the retailer's margin on at least one retail item, the retailer's inventory of the at least one retail item, competitor pricing of the at least one retail item, and competitor promotion of the at least one retail item. In some embodiments, the software module configured to present a price discount to a consumer presents a coupon, coupon code, voucher, or integration with an appropriate back-end retailer process. In further embodiments, the coupon, coupon code, voucher, or integration with an appropriate back-end retailer process is valid for a limited period of time. In some embodiments, a presented price discount is acceptable or rejectable by the consumer. In some embodiments, the application further comprises a software module configured to identify a next closest physical retailer outlet. In further embodiments, the application further comprises a software module configured to query the next closest retailer for an individual consumer price discount on the at least one retail item for a consumer based on the online price.

In another aspect, disclosed herein are computer-implemented methods comprising the steps of: receiving, by a computer, location information and identifying, by the computer, a physical retailer outlet; receiving, by the computer, product information and identifying at least one retail item; identifying. by the computer, an online price for the at least one retail item; querying, by the computer, the retailer for an individual price discount on the at least one retail item for the consumer based on the online price; and presenting, by the computer, a price discount to the consumer. In some embodiments, the product information is from: scanning a bar code, voice input from a consumer, text input from a consumer, a photograph or video, and a near field communication (NFC) signal. In further embodiments, the bar code is a Universal Product Code (UPC) code, Quick Response (QR) code, or High Capacity Color Barcode (HCCB). In further embodiments, the NFC signal is an RFID or Bluetooth signal. In some embodiments, the at least one retail item is selected from: consumer electronics, jewelry, watches, automotive parts, automotive accessories, sporting goods, exercise equipment, musical instruments, motorcycles parts, motorcycle accessories, furniture, and mattresses. In some embodiments, the location information comprises latitude and longitude or a physical street address. In some embodiments, querying the retailer comprises querying a discount algorithm preconfigured by the retailer. In further embodiments, the discount algorithm comprises: an item, a minimum price, effective dates/times, and effective retailer outlet locations. In some embodiments, the price discount is further based on one or more of: other items identified by the consumer, purchases made by the consumer, price discounts presented to the consumer, price discounts accepted by the consumer, and price discounts rejected by the consumer. In some embodiments, the price discount is further based on one or more of: the retailer's margin on at least one retail item, the retailer's inventory of the at least one retail item, competitor pricing of the at least one retail item, and competitor promotion of the at least one retail item. In some embodiments, presenting a price discount to a consumer comprises presenting a coupon, coupon code, voucher, or integration with an appropriate back-end retailer process. In further embodiments, the coupon, coupon code, voucher, or integration with an appropriate back-end retailer process is valid for a limited period of time. In some embodiments, a presented price discount is acceptable or rejectable by the consumer. In some embodiments, the method further comprises the step of identifying, by the computer, a next closest physical retailer outlet. In further embodiments, the method further comprises the step of querying, by the computer, the next closest retailer for an individual consumer price discount on the at least one retail item for a consumer based on the online price.

In another aspect, disclosed herein are computer-readable storage media encoded with a price discount: the price discount being dynamically generated for an individual consumer and for at least one retail item, both the consumer and the at least one retail item within a physical retailer outlet; the price discount derived by querying the retailer for a price discount on the at least one retail item based on an online price; the price discount being valid for a limited period of time, the price discount in the form of a coupon, coupon code, voucher, or integration with an appropriate back-end retailer process. In some embodiments, the price discount is derived by querying a discount algorithm preconfigured by the retailer. In further embodiments, the discount algorithm comprises: an item, a minimum price, effective dates/times, and effective retailer outlet locations. In some embodiments, the price discount is further based on one or more of: other items identified by the consumer, purchases made by the consumer, price discounts presented to the consumer, price discounts accepted by the consumer, and price discounts rejected by the consumer. In some embodiments, the price discount is further based on one or more of: the retailer's margin on at least one retail item, the retailer's inventory of the at least one retail item, competitor pricing of the at least one retail item, and competitor promotion of the at least one retail item. In some embodiments, the price discount is presented to the consumer via a mobile application. In some embodiments, the price discount is acceptable or rejectable by the consumer. In some embodiments, the price discount is derived by identifying a next closest physical retailer outlet and querying the next closest retailer for an individual consumer price discount on the at least one retail item based on the online price.

In yet another aspect, disclosed herein are retail sale recapture platforms comprising: a processor configured to provide an application comprising: a software module for allowing a consumer to identify at least one retail item, a software module for identifying the location of the consumer; a software module for transmitting retail item and location information to a server application; a server processor configured to provide a server application comprising: a software module for identifying an online price for the at least one retail item; a software module for querying a nearest retailer for an individual price discount on the at least one retail item for the consumer based on the online price; a software module for presenting a price discount to the consumer. In some embodiments, the software module for allowing a consumer to identify at least one retail item identifies an item by one or more of: consumer entry of a model number, consumer entry of a UPC code, consumer entry of a URL. In some embodiments, the at least one retail item is selected from: consumer electronics, jewelry, watches, automotive parts, automotive accessories, sporting goods, exercise equipment, musical instruments, motorcycles parts, motorcycle accessories, furniture, and mattresses. In some embodiments, the software module for identifying the location of the consumer requests location information from a processing device. In further embodiments, the location information is determined by one or more of: WiFi base station location, IP address, and user input. In some embodiments, the software module for querying a retailer for an individual price discount queries a discount algorithm preconfigured by the retailer. In further embodiments, the discount algorithm comprises: an item, a minimum price, effective dates, effective times, and optionally, effective retailer outlet locations. In some embodiments, the price discount is further based on one or more of: other items identified by the consumer, purchases made by the consumer, price discounts presented to the consumer, price discounts accepted by the consumer, and price discounts rejected by the consumer. In some embodiments, the price discount is further based on one or more of: the retailer's margin on at least one retail item, the retailer's inventory of the at least one retail item, competitor pricing of the at least one retail item, and competitor promotion of the at least one retail item. In some embodiments, the server application further comprises a software module for configuring discount algorithms, the module adapted for use by retailers. In some embodiments, the software module for presenting a price discount to the consumer presents a coupon, coupon code, voucher, or integration with an appropriate back-end retailer process. In further embodiments, the coupon, coupon code, voucher, or integration with an appropriate back-end retailer process is valid for a limited period of time. In some embodiments, a presented price discount is acceptable or rejectable by the consumer. In some embodiments, the server application further comprises a software module for identifying a next closest physical retailer outlet. In further embodiments, the server application further comprises a software module for querying the next closest retailer for an individual price discount on the at least one retail item for the consumer based on the online price. In some embodiments, the platform further comprises a database, in a computer memory, of retailers participating in a retail sale recapture program.

DETAILED DESCRIPTION OF THE INVENTION

Figure 1:
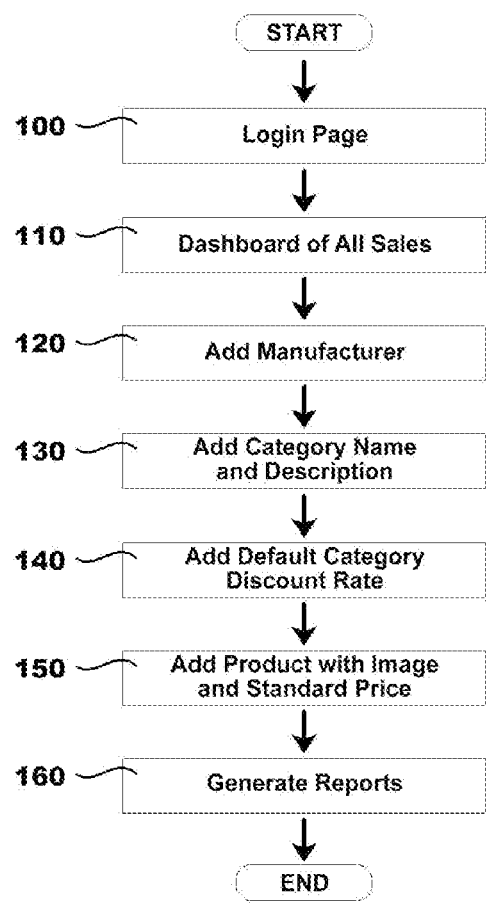
FIG. 1 shows a non-limiting exemplary process flow; in this case, a process flow describing administration of a system described herein by a participating retailer.

Current attempts to counter online retailers by matching prices is not effective—it gives away value to those who might never have sought it, and undermines margins needed to cover costs that online retailers do not incur. No retailer can afford to consistently advertise such a policy—it would mean giving away value to many who would not otherwise have sought it. However, for many retailers, there is a long felt need to have an opportunity to match prices for those customers who were certain to shop online anyway.

Described herein, in various embodiments, is a mobile application, made available to consumers looking for tools to enable "showrooming" In some embodiments, the mobile application is configured to attempt to complete a sale at the brick and mortar (e.g., physical) "showroom" before the shopper completes their purchase with an out-of-network online vendor. In some cases, such an application relies on the principle that a brick and mortar (e.g., physical) retailer, in certain cases, would want to match an online price rather than lose the sale—particularly where margins could be recovered by ancillary sales (e.g., extended warranty, adjacent products, accessories, etc.).

Advantages of the platforms, systems, software, applications, and methods described herein include, but are not limited to, identifying particular shoppers who intend to shop online after examining an item in a physical retail store and offering a comparable price to that particular shopper at that particular moment. Further advantages of the platforms, systems, software, applications, and methods described herein include preserving margins, retaining sales, and maximizing the ability to sell ancillary products and/or services which would not need to be discounted. Still further advantages include allowing retailers to build deeper customer relationships and achieve visibility into the practice of showrooming, particularly the magnitude of the practice, what products are showroomed, where showrooming is occurring, and what kinds of discounts are consumers achieving by showrooming. Retailers are empowered to advantageously use such information to inform pricing strategies.

Described herein, in certain embodiments, are retail sale recapture platforms comprising: a mobile processor configured to provide a mobile application comprising: a software module for allowing a consumer to identify at least one retail item, the at least one retail item within a physical retailer outlet; a software module for identifying the location of the physical retailer outlet; a software module for transmitting retail item and location information to a server application; a server processor configured to provide a server application comprising: a software module for identifying an online price for the at least one retail item; a software module for querying the retailer for an individual price discount on the at least one retail item for the consumer based on the online price; a software module for presenting a price discount to the consumer by the mobile application.

Also described herein, in certain embodiments, are computer-implemented systems comprising: a mobile digital processing device comprising an operating system configured to perform executable instructions and a memory device; a computer program including instructions executable by the mobile digital processing device to create a mobile retail sale recapture application comprising: a software module configured to allow a consumer to identify at least one retail item, the at least one retail item within a physical retailer outlet; a software module configured to identify the location of the physical retailer outlet; a software module configured to query the retailer for an individual consumer price discount on the at least one retail item based an online price for the at least one retail item; and a software module configured to present a price discount to the consumer.

Also described herein, in certain embodiments, are computer-readable storage media encoded with a computer program including instructions executable by a processor to create a retail sale recapture mobile application comprising: a software module configured to allow a consumer to identify at least one retail item, the at least one retail item within a physical retailer outlet; a software module configured to identify the location of the physical retailer outlet; a software module configured to query the retailer for an individual consumer price discount on the at least one retail item based an online price for the at least one retail item; and a software module configured to present a price discount to the consumer.

Also described herein, in certain embodiments, are computer-readable storage media encoded with a computer program including instructions executable by a processor to create a retail sale recapture server comprising: a database, in a computer memory, of retailers and retailer locations; a software module configured to receive location information and identify a physical retailer outlet; a software module configured to receive product information and identify at least one retail item; a software module configured to identify an online price for the at least one retail item; a software module configured to query the retailer for an individual consumer price discount on the at least one retail item based on the online price; and a software module configured to present a price discount to a consumer.

Also described herein, in certain embodiments, are computer-implemented methods comprising the steps of: receiving, by a computer, location information and identifying a physical retailer outlet; receiving, by the computer, product information and identifying at least one retail item; identifying, by the computer, an online price for the at least one retail item; querying, by the computer, the retailer for an individual price discount on the at least one retail item for the consumer based on the online price; and presenting, by the computer, a price discount to the consumer.

Also described herein, in certain embodiments, are computer-readable storage media encoded with a price discount: the price discount being dynamically generated for an individual consumer and for at least one retail item, both the consumer and the at least one retail item within a physical retailer outlet; the price discount derived by querying the retailer for a price discount on the at least one retail item based on an online price; the price discount being valid for a limited period of time, the price discount in the form of a coupon, coupon code, voucher, or integration with an appropriate back-end retailer process.

Also described herein, in certain embodiments, are retail sale recapture platforms comprising: a processor configured to provide an application comprising: a software module for allowing a consumer to identify at least one retail item, a software module for identifying the location of the consumer; a software module for transmitting retail item and location information to a server application; a server processor configured to provide a server application comprising: a software module for identifying an online price for the at least one retail item; a software module for querying a nearest retailer for an individual price discount on the at least one retail item for the consumer based on the online price; a software module for presenting a price discount to the consumer.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, "retail item" refers to "any good or service for sale susceptible to comparison shopping by a consumer."

Identifying a Retail Item

In some embodiments, the platforms, systems, software, applications, and methods described herein include a software module for allowing a consumer (e.g., shopper) to identify at least one retail item, or use and/or provision of the same. In some embodiments, a consumer identifies one retail item at a time. In other embodiments, a consumer identifies more than one retail item simultaneously. Because a variety of methods and technologies are suitable to identify a retail item, a wide range of numbers of retail items are suitably identified at any given time. In various embodiments, a consumer simultaneously identifies 1, 2, 3, 4, 5, 6, 7, 8, 9, 10, 11, 12, 13, 14, 15, 16, 17, 18, 19, 20 or more retail items simultaneously. In various further embodiments, a consumer simultaneously identifies 20, 30, 40, 50, 60, 70, 80, 90, 100, 200, 300, 400, 500 or more retail items simultaneously, including increments therein.

In some embodiments, a retail item is within a physical retailer outlet. In further embodiments, a retail item is, by way of non-limiting examples, on display or for sale within a physical retailer facility, on display or for sale on the grounds of a physical retailer facility, on display or for sale in the parking lot of a physical retailer facility, on display or for sale in front of or outside a physical retailer facility, and the like. In some embodiments, the retail item is associated with a physical retail outlet such that the location of the physical retail outlet is determinable by geolocation of a mobile processing device present with the retail item.

Many types of retail items are suitable for identification with the platforms, systems, software, applications, and methods described herein. By way of non-limiting example, retail items offered by specialty retailers focused on branded, high-ticket merchandise are particularly well suited for the platforms, systems, software, applications, and methods described herein. By way of further non-limiting example, retail items in verticals that display quick pace of innovation are particularly well suited for the platforms, systems, software, applications, and methods described herein. In various embodiments, suitable retail items include, by way of non-limiting examples, consumer electronics, jewelry and watches, automotive parts and automotive accessories, sporting goods and exercise equipment, musical instruments, motorcycle parts and motorcycle accessories, furniture, mattresses, and the like.

Many methods of retail item identification are suitable for identification with the platforms, systems, software, applications, and methods described herein. In some embodiments, a software module identifies a retail item by scanning a bar code via the camera or other optical features of a mobile processing device described further herein. In further embodiments, the bar code is, by way of non-limiting examples, a Universal Product Code (UPC) code, a Quick Response (QR) code, a High Capacity Color Barcode (HCCB), and the like. In still further embodiments, a software module for allowing a consumer to identify at least one retail item uses information obtained from a bar code to identify a retail item from a database of retail item information. In some embodiments a bar code includes information for one retail item. In other embodiments, a bar code contains information for a plurality of retail items, for example, a package or bundle of items.

In some embodiments, a software module identifies a retail item by capturing a photograph or video of a retail item via the camera or other optical features of a mobile processing device described further herein. In further embodiments, many photograph and video resolutions include enough detail to facilitate product identification. In some embodiments, suitable photographs include 1, 2, 3, 4, 5, 6, 7, 8, 9, 10, 11, 12, 13, 14, 15, 16, 17, 18, 19, 20 or more megapixels. Many photograph formats are suitable including, by way of non-limiting examples, Joint Photographic Experts Group (JPEG), JPEG 2000, Exchangeable image file format (Exif), Tagged Image File Format (TIFF), RAW, Portable Network Graphics (PNG), Graphics Interchange Format (GIF), Windows® bitmap (BMP), portable pixmap (PPM), portable graymap (PGM), portable bitmap file format (PBM), wireless bitmap (WBMP), and WebP. In some embodiments, suitable photographs are uncompressed (e.g., RAW format). In other embodiments, suitable photographs are compressed. Both lossy and lossless image CODECs are suitable. Many video formats are suitable including, by way of non-limiting examples, Windows® Media Video (WMV), Windows® Media®, Motion Picture Experts Group (MPEG), Audio Video Interleave (AVI), Apple® QuickTime®, RealMedia®, Flash® Video, Motion JPEG (M-JPEG), WebM, and Advanced Video Coding High Definition (AVCHD). In some embodiments, video is uncompressed. In other embodiments, video is compressed. In some embodiments, a software module for allowing a consumer to identify at least one retail item uses information obtained from a photograph or video to identify a retail item from a database of retail item information. In some embodiments a photograph includes one retail item. In other embodiments, a photograph includes a plurality of retail items, for example, a package or bundle of items.

In some embodiments, a software module identifies a retail item by accepting voice input from the consumer via the microphone or other audio features of a mobile processing device described further herein. For example, a consumer optionally speaks the name of one or more products into the microphone of a mobile processing device. In some embodiments, a software module identifies a retail item by accepting text input from the consumer via a keyboard, touchscreen, pointing device, or other text input features of a mobile processing device described further herein. For example, a consumer optionally types the name of one or more products.

In some embodiments, a software module identifies a retail item by reading a near field communication (NFC) signal via the NFC communications elements of a mobile processing device described further herein. In further embodiments, the NFC signal is an RFID or Bluetooth signal. For example, a consumer optionally approaches a product display in a retail outlet, wherein the product display broadcasts a NFC signal to communicate information for one or more products to a software module.

Identifying the Location of a Physical Retail Outlet

In some embodiments, the platforms, systems, software, applications, and methods described herein include a software module for identifying the location of the physical retailer outlet, or use and/or provision of the same. In further embodiments, the software module for identifying the location of the physical retailer outlet requests location information from a mobile processing device. In various embodiments, a mobile processing device is in the possession of a consumer present with a retail item within a physical retailer outlet. Accordingly, identification of the location of the physical retailer outlet is achieved by identification of the location of a mobile processing device associated with a consumer. In some embodiments, a mobile processing device identifies location by geolocation via one or more geolocation services.

Geolocation is the identification of the real-world geographic location of an object, such as a computer, mobile smartphone, or a portable computing device such as a laptop or tablet computer. A location is suitably expressed in a number of ways including, by way of non-limiting examples, geographic coordinates (e.g., latitude and longitude), a place name (e.g., county, city, landmark, intersection, etc.), a physical street address, distance from a given location, presence within a specified radius from a given location, and a graphical depiction on a map. In some cases, geolocation involves geocoding to find associated latitude and longitude from other geographic data. In some cases, geolocation involves reverse geocoding to back code latitude and longitude coordinates to a readable address or place name.

Many methods of geolocation are suitable that utilize several underlying sources of location information. In some embodiments, a software module geolocates, for example, a consumer, a mobile processing device, a retail item, or a physical retail outlet using sources of location information including, by way of non-limiting examples, GPS coordinates provided by a processing device, triangulation between mobile phone towers and public masts (e.g., assistive GPS), Wi-Fi connection location, WHOIS performed on IP address or MAC address (e.g., WiFi base station MAC address), GSM/CDMA cell IDs (e.g., identification, triangulation, and multilateration), and location information self-reported by a user. In some embodiments, location information includes position (e.g., latitude and longitude), elevation, heading, speed, orientation, and combinations thereof.

In some embodiments, a software module geolocates, for example, a consumer, a mobile processing device, a retail item, or a physical retail outlet by using the HTML 5 geolocation API. In light of the disclosure provided herein, those of skill in the art will recognize that the HTML 5 geolocation API is supported in Internet Explorer 9.0+, Firefox 3.5+, Safari 5.0+, Chrome 5.0+, Opera 10.6+, iOS 3.0+, Android 2.0+, and Windows Phone 7.5+. In some embodiments, a software module geolocates, for example, a news event or a contributor using methods aligned with W3C Geolocation API (available at: http://dev.w3.org/geo/api/spec-source.html). The W3C Geolocation API defines an interface to location information associated with a processing device (e.g., smartphone, tablet computer, laptop computer, etc.) hosting the implementation, such as latitude and longitude.

In some embodiments, the platforms, systems, software, applications, and methods disclosed herein perform geolocation by one method, such as those disclosed herein. In other embodiments, the platforms, systems, software, applications, and methods disclosed herein perform geolocation by more than one method.

In some embodiments, the geolocation of, for example, a consumer, a mobile processing device, a retail item, or a physical retail outlet is accurate to within at least 100, 90, 80, 70, 60, 50, 40, 30, 20, 10, 9, 8, 7, 6, 5, 4, 3, 2, 1 or fewer kilometers, including increments therein. In further embodiments, the geolocation is accurate to within at least 1000, 900, 800, 700, 600, 500, 400, 300, 200, 100, 90, 80, 70, 60, 50, 40, 30, 20, 10, 9, 8, 7, 6, 5, 4, 3, 2, 1 or fewer meters, including increments therein.

In some embodiments, location information is stored in a database of location information. In further embodiments, the platforms, systems, software, applications, and methods described herein include a database of location information for physical retail outlets. In still further embodiments, a database of location information includes location information for physical retail outlets participating in a retail sale recapture program. In some embodiments, the platforms, systems, software, applications, and methods described herein include a database of location information for consumers using the mobile devices and mobile applications described herein. In further embodiments, the location information is updated in a database upon a consumer's use of a mobile application to identify at least one retail item within a physical retailer outlet. In other embodiments, the location information is updated in a database, for example, once a day, once an hour, once a minute, or once a second, including increments therein. In still further embodiments, the location information is updated in a database on a continuous or substantially continuous basis to provide real-time or substantially real-time location information.

In some embodiments, the platforms, systems, software, applications, and methods described herein include a software module for identifying one or more physical retail outlets close or nearby to a specified location. Accordingly, in some embodiments, the platforms, systems, software, applications, and methods described herein include a software module for determining the distance between a specified location and one or more physical retail outlets, such as those of a retailer participating in a retail sale recapture program. In further embodiments, a software module for determining the distance between a specified location and one or more physical retail outlets identifies outlets within a specified radius from a specified location.

Transmitting Retail Item, Location, and Discount Information

In further embodiments, the platforms, systems, software, applications, and methods described herein include hardware and software elements for establishing, conducting, and maintaining telecommunications. In further embodiments, telecommunications are used by the platforms, systems, software, and applications described herein, for example, to transmit retail item information, transmit location information, identify an online price, query a retailer or a retailer-configured algorithm, transmit price discount information, and the like. In some embodiments, the platforms, systems, software, applications, and methods described herein include a software module for transmitting retail item and location information from a mobile application to a server application. In some embodiments, the platforms, systems, software, applications, and methods described herein include a software module for transmitting discount information from a server application to a mobile application. In some embodiments, the platforms, systems, software, applications, and methods described herein include a software module for transmitting price discount acceptance/rejection information from a mobile application to a server application.

In various embodiments, a module for telecommunications (e.g., transmission of retail item, location, and price discount information) utilizes many suitable communications channels. In some embodiments, the module for telecommunications utilizes wired or fiber optic telephone, wired or fiber optic Internet, Wi-Fi, cellular phone networks, and the like, including combinations thereof. In various embodiments, a module for telecommunications utilizes a wide array of suitable communications protocols. In some embodiments, a module for telecommunications utilizes wired communications protocols. In some embodiments, a module for telecommunications utilizes wireless communications protocols. In further embodiments, suitable communications protocols include, by way of non-limiting examples, 3G (3rd generation mobile telecommunications), 4G (4th generation mobile telecommunications), and geosynchronous and low Earth orbit (LEO) satellite, or combinations thereof. In further embodiments, suitable communications protocols include, by way of non-limiting examples, transmission control protocol/internet protocol (TCP/IP), hypertext transfer protocol (HTTP), hypertext transfer protocol secure (HTTPS), file transfer protocol (FTP), user datagram protocol (UDP), internet message access protocol (IMAP), post office protocol (POP), simple mail transfer protocol (SMTP), and simple network management protocol (SNMP), or combinations thereof. In further embodiments, suitable communications protocols include, by way of non-limiting examples, voice over Internet protocol (VoIP) and voice, or combinations thereof.

In some embodiments, a module for telecommunications (e.g., transmission of retail item, location, and price discount information) utilizes web-based communications including, by way of non-limiting examples, HTTP methods such as GET and POST, web services, instant message, Internet fax, electronic mail, VoIP, or combinations thereof. In other embodiments, a module for telecommunications (e.g., transmission of retail item, location, and price discount information) utilizes cellular network-based communications including, by way of non-limiting examples, SMS, MMS, voice messages, or combinations thereof. In some embodiments, a module for telecommunications provides real-time (e.g., synchronous) or near real-time (e.g., asynchronous) communication or transfer of data and/or information.

Identifying an Online Price for a Retail Item

In some embodiments, the platforms, systems, software, applications, and methods described herein include a software module for identifying an online price for the at least one retail item. In further embodiments, a software module for identifying an online price for the at least one retail item conducts a search of credible online retailers to determine prices offered for the same or similar retail items. Many online retailers are credible and suitable for searching. In various embodiments, credible online retailers include, by way of non-limiting examples, Amazon.com Inc., Staples Inc., Apple Inc., Walmart.com, Dell Inc., Office Depot Inc., Liberty Interactive Corp., Sears Holdings Corp., Netflix Inc., CDW Corp., Best Buy Co., OfficeMax Inc., Newegg Inc., Macy's Inc., W.W. Grainger Inc., Sony Electronics Inc., Costco Wholesale Corp., L.L. Bean Inc., Victoria's Secret Direct & Bath and Body Works, J.C. Penney Co. Inc., HP Home & Home Office Store, Gap Inc. Direct, Target Corp., Williams-Sonoma Inc., Systemax Inc., HSN Inc., Overstock.com Inc., Kohl's Corp., Toys 'R' Us Inc., Amway, Nordstrom Inc., BarnesandNoble.com Inc., Walgreen Co., Redcats USA, Vistaprint NV, Buy.com Inc., Avon Products Inc., Saks Direct, PC Connection Inc., Symantec Corp., Neiman Marcus Group Inc., The Home Depot Inc., Cabela's Inc., Musician's Friend Inc., Abercrombie & Fitch Co., Fanatics Inc., Lowe's Cos. Inc., Urban Outfitters Inc., Gilt Groupe, Wayfair LLC, and the like.

In some embodiments, a software module for identifying an online price for the at least one retail item searches one credible online retailer to determine an online price. In other embodiments, a software module for identifying an online price for the at least one retail item searches a plurality of credible online retailers to determine an online price. In various embodiments, a software module for identifying an online price for the at least one retail item searches about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or more credible online retailers to determine an online price. In various further embodiments, a software module for identifying an online price for the at least one retail item searches at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or more credible online retailers to determine an online price.

In some embodiments, a software module for identifying an online price for the at least one retail item calculates a mean (e.g., average) retail price from a plurality of credible online retailers. In further embodiments, a software module for identifying an online price for the at least one retail item calculates a weighted mean (e.g., average) retail price from a plurality of credible online retailers, wherein the price from one or more online retailers is relied upon more heavily than others. In still further embodiments, weighting is determined by one or more of reputation, ranking, consumer polls or market research, and the like. In other embodiments, a software module for identifying an online price for the at least one retail item calculates a median retail price from a plurality of credible online retailers. In yet other embodiments, a software module for identifying an online price for the at least one retail item utilizes the lowest price found in a search of a plurality of credible online retailers.

Querying a Retailer for an Individual Price Discount

In some embodiments, the platforms, systems, software, applications, and methods described herein include a software module for querying a retailer for an individual price discount on at least one retail item for the consumer. In further embodiments, the retail item or items are present in a physical retail outlet associated with the retailer. In still further embodiments, a price discount is for an individual present in a physical retail outlet associated with the retailer.

In some embodiments, a query for an individual price discount is sent to an entity or individual associated with a retailer. In further embodiments, a query for an individual price discount is sent to an entity or individual associated with a particular physical retailer outlet. In some, an individual or entity responds to a query manually. A query is suitably responded to in a variety of ways. For example, suitable responses to a query include, but are not limited to, offering a price discount, declining to offer a price discount, offering a price discount matching an online price, or offering a partial or modified price discount, and the like.

In other embodiments, a query for an individual price discount is sent to a software module employing an algorithm to formulate a suitable response. Accordingly, in some embodiments, a software module configured to query a retailer for an individual consumer price discount queries a discount algorithm preconfigured by the retailer. In further embodiments, a discount algorithm receives inputs and utilizes the inputs to determine a response. In still further embodiments, a discount algorithm is configured to receive inputs including, by way of non-limiting examples, information identifying an individual, information identifying one or more retail items, information identifying a physical outlet location, and the like.

In some embodiments, a discount algorithm comprises parameters including identification of an item or a group/bundle of items. In further embodiments, identification of an item or items is used to associate appropriate queries to which to apply the algorithm. In some embodiments, a discount algorithm comprises parameters including a minimum price. In further embodiments, a minimum price is used to prevent the algorithm from offering a price discount below a predetermined threshold. In some embodiments, a discount algorithm comprises parameters including an effective starting date and/or an effective ending date. In further embodiments, effective dates/times prevent the algorithm from offering a price discount outside of a predetermined time period. In some embodiments, a discount algorithm comprises parameters including one or more effective retailer outlet locations. In further embodiments, effective retailer outlet locations prevent the algorithm from offering a price discount outside of predetermined locations. In some embodiments, a discount algorithm comprises parameters used to calculate the amount of a price discount including, by way of non-limiting examples, an amount by which to beat an online price, an amount by which to exceed an online price, or a direction to match an online price.

In some embodiments, the platforms, systems, software, applications, and methods described herein include a software module for configuring discount algorithms, the module adapted for use by retailers or individuals or entities associated with retailers. In further embodiments, a software module for configuring discount algorithms allows a retailer to, for example, create, save, modify, delete, activate, and inactivate discount algorithms. In some embodiments, configured discount algorithms are stored in a database of discount algorithms. In some embodiments, a retailer uses a software module for configuring discount algorithms via a web application. In some embodiments, a retailer uses a software module for configuring discount algorithms via a mobile application.

In some embodiments, a configured price discount algorithm is described as "sell up to 2000 units of SKU #X for $1,200.00 or more between January 31 and March 31, in ZIP code XXXXX."

In some embodiments, an individual or entity associated with a retailer or a software algorithm configured by a retailer determines a suitable response to a query for a price discount and if a price discount is to be offered, calculates the amount (e.g., percentage, dollar value, etc.) of a price discount. In some embodiments, where an online price for a retail item or items is determined, an individual price discount is based on the online price. In further embodiments, a price discount is based on an online price by resulting in a retail price that matches the online price, beats the online price, or exceeds the online price. By way of non-limiting example, a price discount algorithm is optionally configured to match an online price for a retail item or items. By way of further example, a price discount algorithm is optionally configured to beat an online price by a predetermined percentage or dollar amount. By way of further example, a price discount algorithm is optionally configured to exceed an online price by a predetermined percentage or dollar amount. In various embodiments, a price discount algorithm is optionally configured to beat an online price by 1, 2, 3, 4, 5, 6, 7, 8, 9, 10, 11, 12, 13, 14, 15, 16, 17, 18, 19, 20, 25, 30, 35, 40, 45, 50, 55, 60, 67, 70 or more percent, including increments therein. In other various embodiments, a price discount algorithm is optionally configured to exceed an online price by 1, 2, 3, 4, 5, 6, 7, 8, 9, 10, 11, 12, 13, 14, 15, 16, 17, 18, 19, 20, 25, 30, 35, 40, 45, 50, 55, 60, 67, 70 or more percent, including increments therein.

In some embodiments, a price discount is based on consumer (e.g., shopper) information such as prior shopping history and behaviors. In further embodiments, a price discount is based on, by way of non-limiting examples, other items identified by the consumer, purchases made by the consumer, price discounts presented to the consumer, price discounts accepted by the consumer, and price discounts rejected by the consumer.

In some embodiments, a price discount is based on consumer (e.g., shopper) demographic information. In further embodiments, a price discount is based on, by way of non-limiting examples, age, income, residence (e.g., address, zip code, etc.) of a consumer.

In some embodiments, a price discount is based on retailer business information. In further embodiments, a price discount is based on, by way of non-limiting examples, the retailer's margin on a retail item, the retailer's inventory of a retail item, competitor pricing of a retail item, and competitor promotion of a retail item.

In some embodiments, a price discount is based on additional sales opportunities for the retailer related to a particular retail item. In further embodiments, a price discount is based on, by way of non-limiting examples, the number, type, and value of additional sales opportunities for a retailer related to a particular retail item.

In some embodiments, a software module for querying a retailer for an individual price discount receives a query response that includes a price discount. In further embodiments, a price discount is passed to a software module for presenting a price discount to the consumer.

Presenting a Price Discount to a Consumer

In some embodiments, the platforms, systems, software, applications, and methods described herein include a software module for presenting a price discount to the consumer by the mobile application, or use and/or provision of the same. In some embodiments, a price discount is presented on the display of a mobile processing device and read by a point of sale or checkout system of a physical retailer. In other embodiments, a price discount is presented on the display of a mobile processing device and keyed into a point of sale or checkout system of a physical retailer. In yet other embodiments, a price discount is presented on the display of a mobile processing device and approved by a manager or other authorized individual at the point of checkout in a physical retailer.

Many technologies are suitable for presenting a price discount described herein by a mobile processing device. In some embodiments, a price discount is presented, for example, as a scanable code, an alphanumeric code, or the like, on the display of a mobile processing device. Suitable scanable codes include, by way of non-limiting examples, linear bar codes (e.g., UPC codes, etc.), two-dimensional bar codes (e.g., QR codes, Datamatrix codes, etc.), and High Capacity Color Barcodes (HCCB). Suitable alphanumeric codes include, by way of non-limiting examples, a plurality of letters, a plurality of numbers, a combination of letters and numbers. In some embodiments, a suitable alphanumeric code further includes punctuation and/or symbols, such as, "@," "#," "%," "*," "$," and the like. In some embodiments, an alphanumeric code is human-readable. In other embodiments, an alphanumeric code is not human-readable. In some embodiments, a price discount is presented, for example, as a link, a hyperlink, or the like, accessible by a web browser running on a mobile processing device. In further embodiments, a consumer (e.g., shopper) uses a displayed link to access a price discount. In other embodiments, a price discount, or a link thereto, is presented, within a screen of a mobile application described herein. In other embodiments, a price discount, or a link thereto, is presented, for example, via email, SMS, MMS, and the like.

Many formats are suitable for a price discount described herein. In some embodiments, a price discount is presented, for example, in the form of a coupon, coupon code, or voucher. In some embodiments, a price discount is integrated with an appropriate retailer back-end process. In various embodiments, appropriate back-end processes include, by way of non-limiting examples, point-of-sale processes, inventory processes, payment processes, security processes, and the like. In some embodiments, a price discount is presented, for example, in the form of points, miles, or other units of value in a virtual economy or loyalty program.

In some embodiments, a price discount described herein is valid for a limited period of time after it is presented. In various embodiments, a price discount is valid for, by way of non-limiting examples, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60 or more minutes, including increments therein. In various embodiments, a price discount is valid for, by way of non-limiting examples, about 1, 2, 3, 4, 5, 6, 7, 8, 9, 10, 11, 12, 13, 14, 15, 16, 17, 18, 19, 20, 21, 22, 23, 24 or more hours, including increments therein. In various embodiments, a price discount is valid for, by way of non-limiting examples, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or more days, including increments therein. In various embodiments, a price discount is valid for, by way of non-limiting examples, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52 or more weeks, including increments therein. In further various embodiments, a price discount is valid for at least 1 minute, 5 minutes, 10 minutes, 15 minutes, 30 minutes, 1 hour, 2 hours, 3 hours, 6 hours, 12 hours, 1 day, 1 week, 1 month, or 1 year, including increments therein. In still further embodiments, a price discount is valid for at most 1 minute, 5 minutes, 10 minutes, 15 minutes, 30 minutes, 1 hour, 2 hours, 3 hours, 6 hours, 12 hours, 1 day, 1 week, 1 month, or 1 year, including increments therein. In other embodiments, a price discount described herein does not expire based on the passage of time.

In some embodiments, a price discount is valid during the consumer's (e.g., shopper's) current visit to a physical retail outlet. In further embodiments, a price discount is invalidated upon a consumer's (e.g., shopper's) leaving a physical retail outlet. In still further embodiments, a price discount is invalidated upon a consumer's (e.g., shopper's) traveling a specified distance from a physical retail outlet. In various embodiments, a price discount is valid while a consumer (e.g., shopper) is less than about 100, 200, 300, 400, 500, 600, 700, 800, 900, 1000 or more meters from a physical retail outlet, including increments therein. In further various embodiments, a price discount is valid while a consumer (e.g., shopper) is less than about 1, 2, 3, 4, 5, 6, 7, 8, 9, 10, 20, 30, 40, 50, 60, 70, 80, 90, 100 or more kilometers from a physical retail outlet, including increments therein. In other embodiments, a price discount described herein does not expire based on the location of a consumer (e.g., shopper).

In some embodiments, a price discount is acceptable or rejectable by a consumer (e.g., shopper). In further embodiments, a price discount includes interactive elements allowing a user to, for example, accept, save, defer, or reject a price discount. Many interactive elements are suitable to capture a consumer's (e.g., shopper's) acceptance or rejection of a price discount including, by way of non-limiting examples, links, buttons, sliders, check boxes, clickable icons, and the like. In some embodiments, a consumer (e.g., shopper) accepts or rejects a price discount by way of gesture using a touch screen or multitouch screen, voice command using a microphone, or shaking a mobile processing device.

In some embodiments, where a consumer (e.g., shopper) rejects a presented price discount, the platforms, systems, software, and applications described herein locate one or more next closest physical retail outlets. In further embodiments, the platforms, systems, software, and applications described herein query one or more retailers with nearby physical retail outlets for a price discount on the one or more identified retail items.

Identifying a Next Closest Physical Retailer

In some embodiments, the platforms, systems, software, applications, and methods described herein include a software module configured to identify a next closest physical retailer outlet, or use and/or provision of the same. In further embodiments, a next closest physical retail is identified where, for example, a closest physical retailer does not offer an identified retail item for sale, does not offer a price discount for a retail item, or a consumer rejects a price discount offered by a closest physical retailer. In some embodiments, a next closest physical retailer outlet is identified by any of the techniques and technologies described herein.

A next closest physical retailer outlet is any suitable distance from a consumer (e.g., shopper), an identified retail item, or a closest physical retailer outlet. In various embodiments, a next closest physical retailer outlet is about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100 or more kilometers from a consumer (e.g., shopper), an identified retail item, or a closest physical retailer outlet. In further various embodiments, a next closest physical retailer outlet is less than 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100 or more kilometers from a consumer (e.g., shopper), an identified retail item, or a closest physical retailer outlet. In still further various embodiments, a next closest physical retailer outlet is at least 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100 or more kilometers from a consumer (e.g., shopper), an identified retail item, or a closest physical retailer outlet.

In some embodiments, a software module configured to identify a next closest physical retailer outlet identifies second, third, fourth, fifth, sixth, seventh, eighth, ninth, tenth, and subsequently closest physical retailer outlets. In some embodiments, a software module configured to identify a next closest physical retailer outlet identifies additional physical retailer outlets at increasing distance from a consumer (e.g., shopper), an identified retail item, or a closest physical retailer outlet. In various embodiments, a software module configured to identify a next closest physical retailer outlet identifies about 1, 2, 3, 4, 5, 6, 7, 8, 9, 10, 11, 12, 13, 14, 15, 16, 17, 18, 19, 20, or more additional physical retailer outlets. In various further embodiments, a software module configured to identify a next closest physical retailer outlet identifies about 10, 20, 30, 40, 50, 60, 70 80, 90, 100, or more additional physical retailer outlets, including increments therein. In various embodiments, a software module configured to identify a next closest physical retailer outlet identifies at least 1, 2, 3, 4, 5, 6, 7, 8, 9, 10, 11, 12, 13, 14, 15, 16, 17, 18, 19, 20, or more additional physical retailer outlets. In various further embodiments, a software module configured to identify a next closest physical retailer outlet identifies at least 10, 20, 30, 40, 50, 60, 70 80, 90, 100, or more additional physical retailer outlets, including increments therein.

Querying a Next Closest Retailer for an Individual Price Discount

In some embodiments, the platforms, systems, software, applications, and methods described herein include a software module configured to query a next closest retailer for an individual consumer price discount on the at least one retail item for the consumer, or use and/or provision of the same. In still further embodiments, a next closest retailer is queried where, for example, a closest retailer does not offer an indentified retail item for sale, does not offer a price discount for a retail item, or a consumer (e.g., shopper) rejects a price discount offered by a closest retailer. In some embodiments, a next closest retailer is queried by any of the techniques and technologies described herein.

In some embodiments, a software module configured to query a next closest retailer for an individual consumer price discount queries second, third, fourth, fifth, sixth, seventh, eighth, ninth, tenth, and subsequently closest physical retailers. In some embodiments, a software module configured to query a next closest retailer queries additional physical retailers at increasing distance from a consumer (e.g., shopper), an identified retail item, or a closest physical retailer. In various embodiments, a software module configured to query a next closest retailer queries about 1, 2, 3, 4, 5, 6, 7, 8, 9, 10, 11, 12, 13, 14, 15, 16, 17, 18, 19, 20, or more additional physical retailers. In various further embodiments, a software module configured to query a next closest retailer queries about 10, 20, 30, 40, 50, 60, 70 80, 90, 100, or more additional physical retailers, including increments therein. In various embodiments, a software module configured to query a next closest retailer queries at least 1, 2, 3, 4, 5, 6, 7, 8, 9, 10, 11, 12, 13, 14, 15, 16, 17, 18, 19, 20, or more additional physical retailers. In various further embodiments, a software module configured to query a next closest retailer queries at least 10, 20, 30, 40, 50, 60, 70 80, 90, 100, or more additional physical retailers, including increments therein.

In some embodiments, a query for an individual price discount is sent to an entity or individual associated with a next closest (or subsequently closest) retailer as described herein. In other embodiments, a query for an individual price discount is sent to a software module employing an algorithm to formulate a suitable response as described herein.

In some embodiments, a software module configured to query a next closest retailer for an individual price discount receives a query response that includes a price discount. In further embodiments, a price discount is passed to a software module for presenting a price discount to the consumer described herein.

Methods

The inventions disclosed herein include methods of providing participating retailers with opportunities to offer individualized price discounts to showrooming consumers (e.g., shoppers). In various embodiments, the methods include the steps of: receiving location information and identifying a physical retailer outlet; receiving product information and identifying at least one retail item; identifying an online price for the at least one retail item; querying the retailer for an individual price discount on the at least one retail item for the consumer based on the online price; and presenting a price discount to the consumer. In further embodiments, the methods include the steps of providing access to applications comprising software modules configured to perform the steps of: receiving location information and identifying a physical retailer outlet; receiving product information and identifying at least one retail item; identifying an online price for the at least one retail item; querying the retailer for an individual price discount on the at least one retail item for the consumer based on the online price; and presenting a price discount to the consumer.

The inventions disclosed herein include business methods. In some embodiments, the platforms, systems, software, applications, and methods disclosed herein are marketed, advertised, and sold as, for example, products for providing brick and mortar retail organizations with opportunities to offer individualized price discounts to showrooming shoppers (e.g., retail sale recapture programs, tools to compete with online retailers in showrooming situations, etc.). In some embodiments, the mobile applications disclosed herein are marketed, advertised, and distributed as, for example, consumer showrooming applications and software. In some embodiments, the server applications disclosed herein are marketed, advertised, and distributed as, for example, physical retailer sale recapture applications and software. In other embodiments, the systems, software, applications, and methods disclosed herein are marketed, advertised, and sold (or distributed) as, for example, services for providing physical retailers with tools to compete with online retailers in showrooming situations. In further embodiments, the services are provided as platform as a service (PaaS). In further embodiments, the services are provided as software as a service (SaaS). The platforms, systems, software, applications, methods, and services disclosed herein are particularly well suited for use by physical retailers of consumer electronics or other branded, high-ticket merchandise. In still further embodiments, participating retailers pay a commission to a service provider on completed sales transactions. In various embodiments, a commission on completed sales transactions is about 1, 2, 3, 4, 5, 6, 7, 8, 9, 10, 11, 12, 13, 14, 15 or more percent, including increments therein.

Digital Processing Device

In some embodiments, the platforms, systems, software, applications, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, a digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, a device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, a digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, a digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, a digital processing device includes a digital camera. In some embodiments, a digital camera captures digital images. In some embodiments, the digital camera is an autofocus camera. In some embodiments, a digital camera is a charge-coupled device (CCD) camera. In further embodiments, a digital camera is a CCD video camera. In other embodiments, a digital camera is a complementary metal-oxide-semiconductor (CMOS) camera. In some embodiments, a digital camera captures still images. In other embodiments, a digital camera captures video images. In various embodiments, suitable digital cameras include 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, and higher megapixel cameras, including increments therein. In some embodiments, a digital camera is a standard definition camera. In other embodiments, a digital camera is an HD video camera. In further embodiments, an HD video camera captures images with at least about 1280× about 720 pixels or at least about 1920× about 1080 pixels. In some embodiments, a digital camera captures color digital images. In other embodiments, a digital camera captures grayscale digital images. In various embodiments, digital images are stored in any suitable digital image format. Suitable digital image formats include, by way of non-limiting examples, Joint Photographic Experts Group (JPEG), JPEG 2000, Exchangeable image file format (Exif), Tagged Image File Format (TIFF), RAW, Portable Network Graphics (PNG), Graphics Interchange Format (GIF), Windows® bitmap (BMP), portable pixmap (PPM), portable graymap (PGM), portable bitmap file format (PBM), and WebP. In various embodiments, digital images are stored in any suitable digital video format. Suitable digital video formats include, by way of non-limiting examples, AVI, MPEG, Apple® QuickTime®, MP4, AVCHD®, Windows Media®, DivX™, Flash Video, Ogg Theora, WebM, and RealMedia.

Computer Readable Storage Medium

In some embodiments, the platforms, systems, software, applications, and methods disclosed herein include one or more computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, software, applications, and methods disclosed herein include at least one computer program, or use of the same. A computer program includes a sequence of instructions, executable in the digital processing device's CPU, written to perform a specified task. In light of the disclosure provided herein, those of skill in the art will recognize that a computer program may be written in various versions of various languages. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

The platforms, systems, software, applications, and methods disclosed herein include, in various embodiments, software, server, and database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Particular Embodiments

Referring to FIG. 1, in a particular embodiment, a participating retailer administers a system described herein. In this embodiment, a participating retailer utilizes a login page 100 to access a retailer dashboard of sales 110. From the dashboard of sales 110 the retailer adds a new manufacturer 120, and adds a new retail item category name and description 130. Further in this embodiment, a participating retailer configures a default retail item category discount rate 140 and adds a retail item in the category with a product image and a standard (e.g., undiscounted) price 150.

Figure 2:
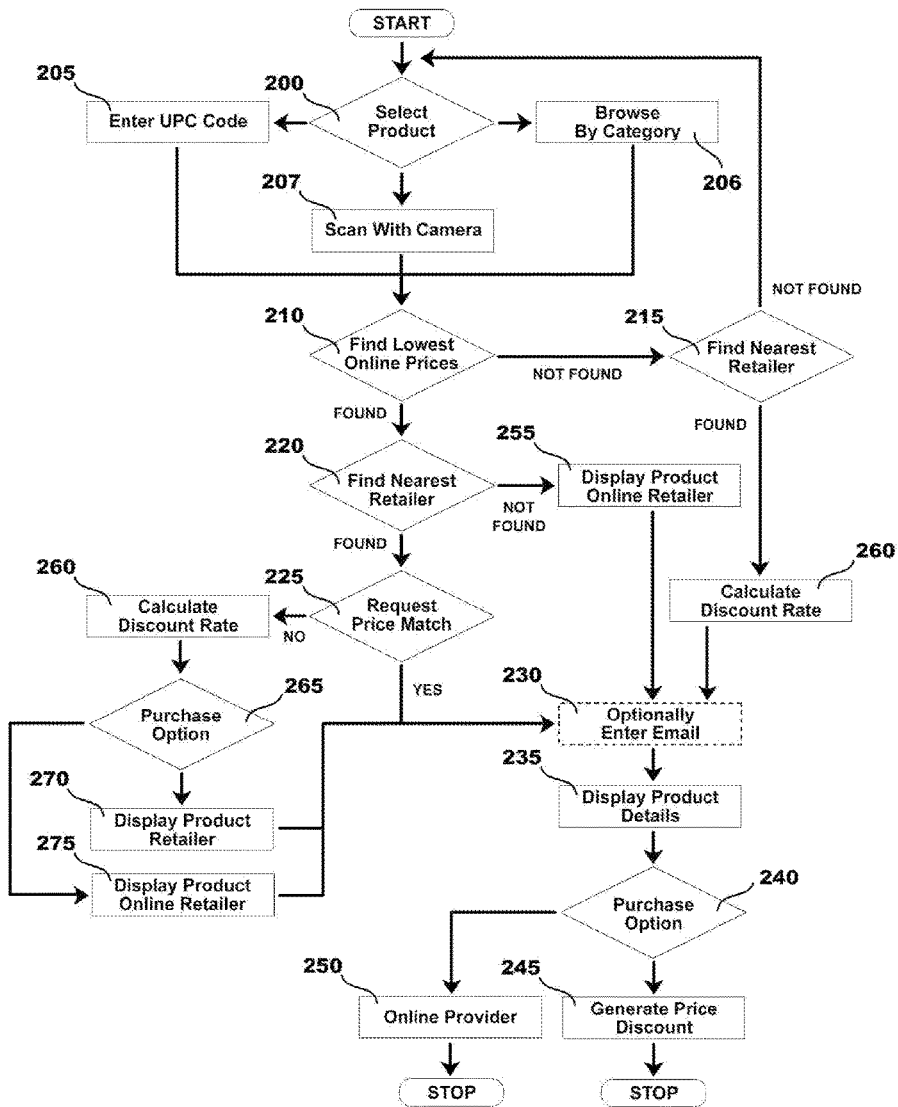
FIG. 2 shows a non-limiting exemplary process flow; in this case, a process flow describing and end-to-end purchase using a mobile embodiment of a system described herein.

Referring to FIG. 2, in a particular embodiment, a consumer (e.g., shopper) completes a purchase using the systems described herein. In this embodiment, a consumer (e.g., shopper) selects a product to identify 200. Further, in this embodiment, three methods of product selection are suitable: 1) manually entering a UPC code 205, 2) browsing for a product via a hierarchy of categories 206, and 3) scanning a product or code with the camera of the mobile device 207. Once a product (e.g., retail item) is identified a search is conducted for a lowest online price among credible online retailers 210. If a lowest online price is determined a search is conducted for a nearest physical retail outlet 220 and a request is made for the physical retailer to match the lowest online price 225. If the retailer opts to match the lowest online price, a consumer enters an email address 230, product details are displayed 235, and a consumer selects a purchase option 240. In this embodiment, purchase options include using an online provider 250 or generating a price discount for use within a physical retail outlet 245. In the case where a lowest online price is not determined, a search is conducted for a nearest physical retail outlet 215, which calculates a discount rate 260 for the retail item, after which a consumer optionally continues the purchase process. In the case where a nearest physical retail outlet is not determined, an online retailer is displayed 255 after which a consumer optionally continues the purchase process. In the case where a nearest physical retailer outline does not match a lowest online price for the retail item, the retailer calculates a discount rate 260 and a consumer is provided with the purchase options 265 by displaying physical retail outlet 270 and an online retailer 275.

Figure 3:
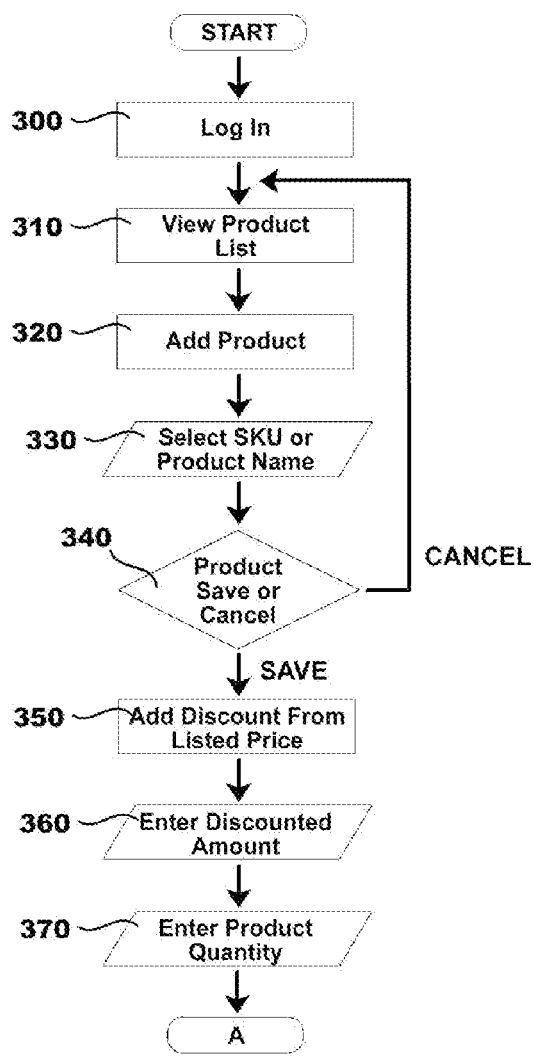
FIGS. 3 and 4 show a non-limiting exemplary process flow; in this case, a process flow describing a participating retailer's use of a system described herein to manage products offered.
Figure 4:
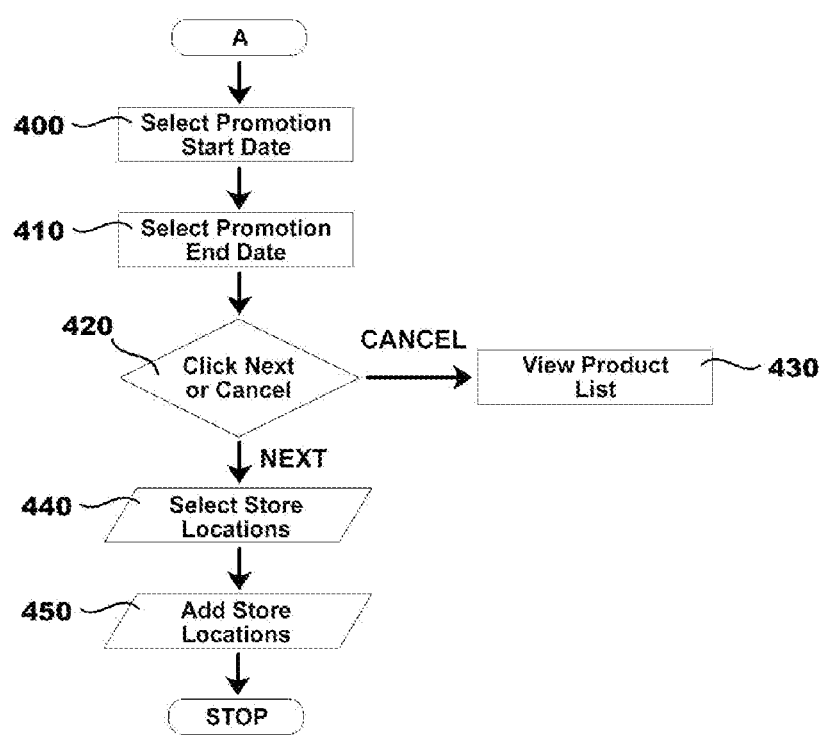

Referring to FIGS. 3 and 4, in a particular embodiment, a participating retailer uses a system described herein to manage products offered. In this embodiment, a participating retailer logs in 300 to view a product list 310. Further, in this embodiment, a participating retailer adds a new product 320, selects either a product SKU or product name 330, and optionally saves or cancels the addition 340. If the addition is saved, a participating retailer adds a discount 350 associated with the product, enters a discounted amount 360 for the product, and enters a discounted product quantity 370.

Continuing to refer to FIGS. 3 and 4, in a particular embodiment, a participating retailer configures a promotion start date 400 and a promotion end date 410. Further, in this embodiment, a participating retailer either clicks "Next" or "Cancel" 420. If a retailer cancels, they are returned to a product list 430. If a retailer proceeds, they complete the procedure by selecting 440 and adding 450 promotion locations (e.g., participating store locations).

Figure 5:
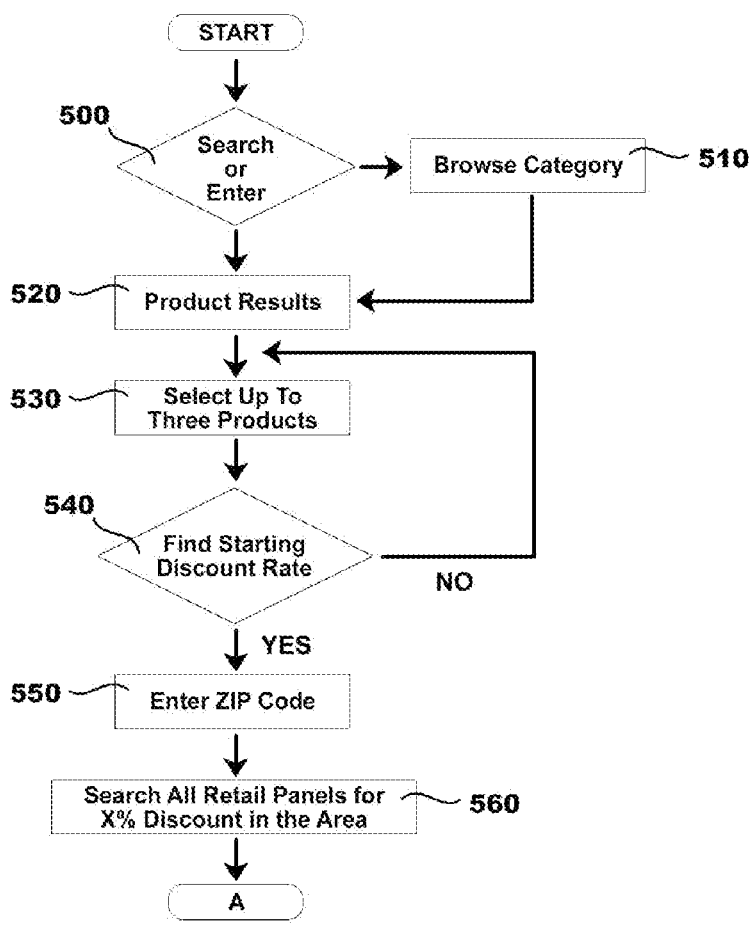
FIGS. 5, 6, and 7 show a non-limiting exemplary process flow; in this case, a process flow describing a consumer's (e.g., shopper's) use of a desktop (e.g., non-mobile) embodiment of a system described herein to identify a product, request a discount, and purchase a discounted product.
Figure 6:
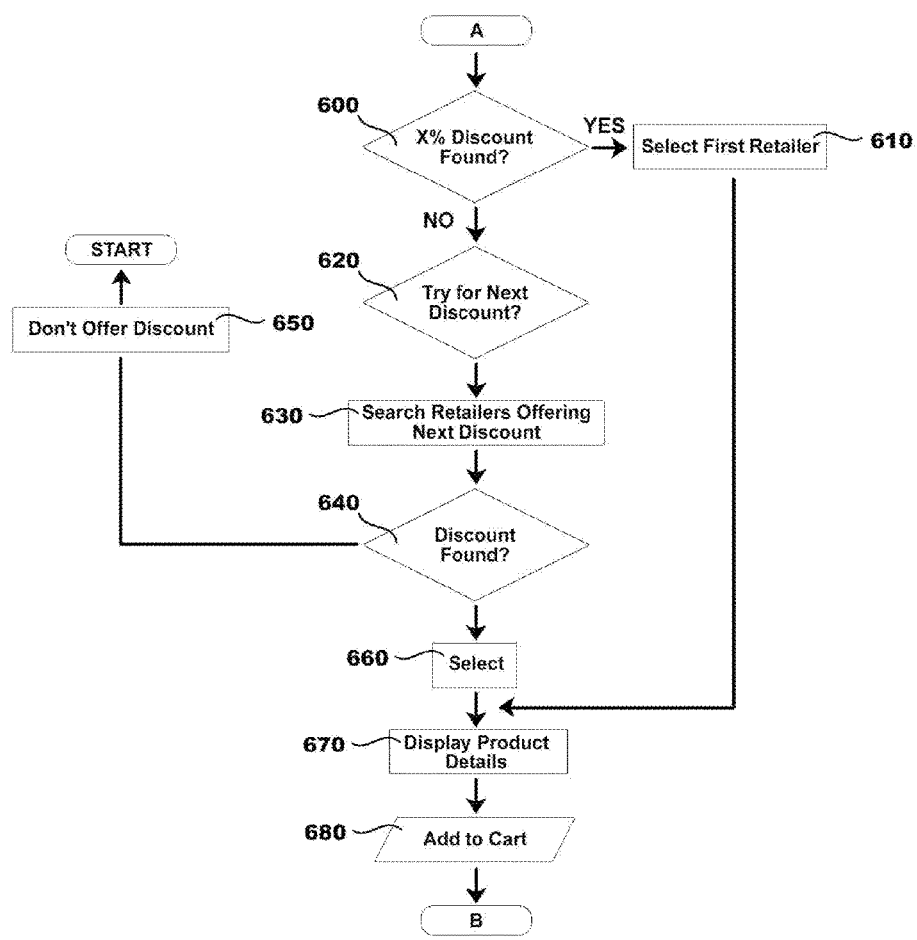
Figure 7:
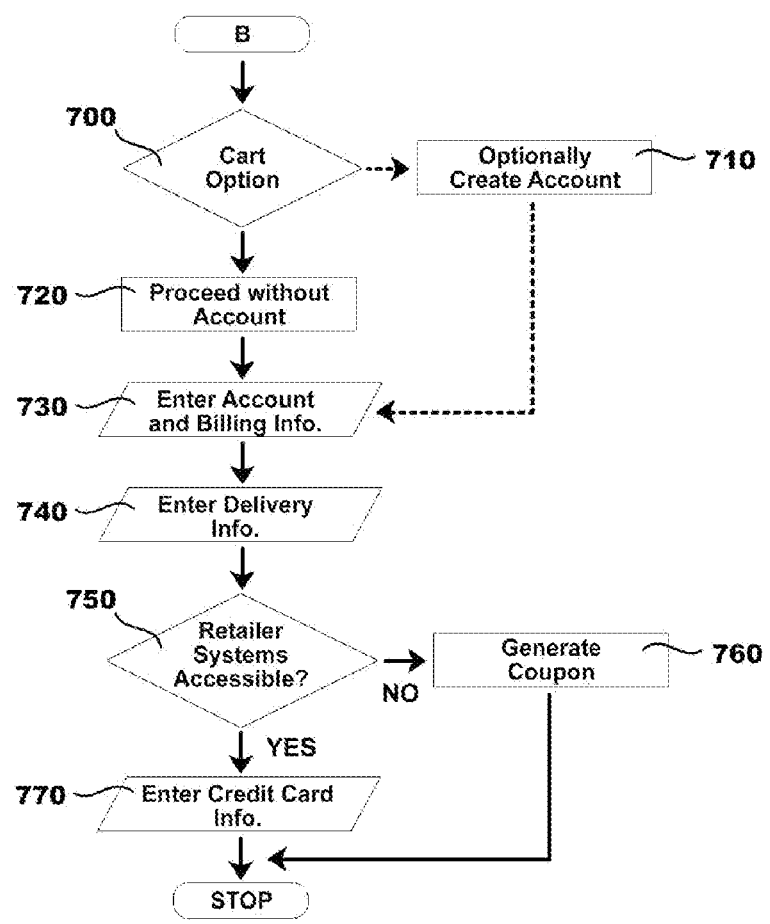

Referring to FIGS. 5, 6, and 7, in a particular embodiment, a consumer (e.g., shopper) uses of a system described herein to identify a product, request a discount, and purchase a discounted product. In this embodiment, a consumer optionally searches for a retail item or enters retail item information 500. Where a consumer searches for a retail item, a consumer browses within a category of retail items 510. In this embodiment, whether searching or entering retail item information, a consumer views product results 520 and selects up to three retail items 530. Further, in this embodiment, a consumer is presented with a starting discount rate for the retail items 540. If the retail items are offered at a discounted rate, a consumer optionally enters a zip code 550 to determine location and search for other discounts offered by nearby retailers in the area 560.

Continuing to refer to FIGS. 5, 6, and 7, in a particular embodiment, if an offered discount is found in the area 600, a consumer (e.g., shopper) selects a retailer 610, views product details 670, and optionally adds a retail item to a shopping cart 680. If a consumer (e.g., shopper) wishes to try for a next, potentially deeper, discount 620, the next step is to search for next closest retailers offering a next discount 630. In this embodiment, where a discount is found, a consumer (e.g., shopper) selects a retailer 660, views product details 670, and optionally adds a retail item to a shopping cart 680. In this embodiment, where a discount is not found, a consumer (e.g., shopper) optionally starts the process from the beginning.

Continuing to refer to FIGS. 5, 6, and 7, in a particular embodiment, a consumer (e.g., shopper) is presented with cart options 700 including creating an account 710 or proceeding without an account 720. Thereafter, in this embodiment, a consumer enters account and billing information 730, enters delivery information 740. If the retailer utilizes computer systems that are accessible (through, for example, APIs) 750, a consumer completes the transaction by entering credit card information 770. If the retailer utilizes an inaccessible computer system 750, the system generates a coupon for the consumer 760.

EXAMPLES

The following illustrative examples are representative of embodiments of the software applications, systems, and methods described herein and are not meant to be limiting in any way.

Example 1—Participating Retailer Use of Online Configuration

A national brick and mortar consumer electronics retailer participates in a dynamic retail sale recapture program. The retailer's goal in participation is to salvage 50% or more of in-store sales lost to consumers who evaluate products on their showroom floor, but ultimately purchase from an alternative online retailer.

A sales/category manager for the retailer logs into a web based system offered as software-as-a-service. She is presented with a retailer dashboard showing all products her organization has configured in the system. She configures 30 manufacturers offering products in 15 categories. Within each category, she configures 750 consumer electronics products offered for sale. Each product includes a description, image, and a standard (e.g., undiscounted) price. For each category of products, she configures a default discount rate to be applied in the absence of a specific promotion.

Based on an inventory back-log of a particular plasma television, the sales/category manager proceeds to configure a price discount algorithm that will offer specific deeper price discounts for that product to individual consumers who express interest in a purchase. Using an online tool accessible from the sales dashboard, she configures parameters for the price discount algorithm including the product's SKU, the product's name, a promotion start date, a promotion end date, and retail outlet locations where the discount will be offered. She also configures the price discount; in this case, she configures the algorithm to match an average price of reputable online retailers.

The sales/category manager next uses a tool to generate a sales report. She views both price discounts offered and sales of products through the dynamic retail sale recapture system. She uses sales report tool to view and print reports organized by retail outlet location, by promotion, and by product. Specifically, the sales/category manager generates a series of reports including reports on: which products are discounted, the amounts of the price discounts, how often consumers express interest in showrooming each product, and the relative frequency of showrooming in each of her retail outlets.

Example 2—Consumer Use of Mobile Application

A consumer wishes to purchase a new plasma television. He drives to his local consumer electronics retailer to compare products and evaluate the picture and sound quality. He is loyal to a particular manufacturer but is not yet decided on a model. After viewing many televisions in the showroom of the retailer, he selects the product in which he is most interested.

The consumer is among the growing ranks of shoppers who take advantage of physical retail showrooms, but prefer to seek discounted prices offered by online retailers when it is time to purchase. In this case, the consumer has brought his HTC® One X™ mobile phone running the Google® Android® operating system onto which he has installed a mobile application for requesting individual price discounts described herein. Rather than wait two weeks for an online purchase to be delivered, the consumer activates the mobile application and uses the application to scan a QR code on the floor model via his mobile device's camera.

The application translates the QR code to a SKU number and uses the devices GIS system to determine the consumer's geolocation. The application transmits the product and location information to a server application hosted in a cloud computing service. At the server, 20 reputable online retailers are searched and a lowest online price is determined as well as an average online price. Next, the server application determines the physical retailer outlet that the consumer is currently visiting and determines that the retailer is a participant in the program. The server application queries the retailer's data to determine that the retailer offers the product and that the retailer has configured a price discount algorithm for the identified plasma television. The server application determines that the algorithm is applicable to the current date and retail outlet. A price discount coupon is generated and presented to the consumer via his mobile device offering to match the average online price. The coupon includes buttons to accept or reject the price discount.

The consumer opts to reject the offered price discount and uses the mobile application to search for a next closest physical retailer participating in the program and offering the plasma television for sale. The server application determines that there are 5 additional participating retailers with retail outlets within 10 miles of the consumer's location. The application then queries the next closest retailer for an individual price discount. The next closest participating retailer offers a price discount matching the lowest online price, which the consumer accepts. After driving to the next retail outlet, the consumer presents a coupon code at checkout to realize the accepted discount.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A platform for recapture of retail sales in showrooming situations comprising:
   a. a mobile processor configured to provide a mobile application comprising:
      i. a software module for allowing a consumer to identify at least one retail item, the at least one retail item within a physical retailer outlet, wherein identification of the at least one retail item indicates the consumer's intent to showroom the at least one retail item to the retailer;
      ii. a software module for identifying the location of the physical retailer outlet;
      iii. a software module for transmitting retail item and location information to a server application;
   b. a server processor configured to provide a server application comprising:
      i. a software module for querying the retailer to offer or decline to offer a discounted price to the consumer, the discounted price dynamically generated based on inputs comprising the at least one retail item and the consumer, the retailer queried being the retailer where the at least one retail item and the consumer are present and that the consumer indicated they intend to showroom, the query consisting essentially of information sent from the server application to the retailer or an entity or individual associated with the retailer without presentation of the query to the consumer;
      ii. a software module for presenting the discounted price offered by the retailer to the consumer, the discounted price presented at the mobile application, thereby creating an opportunity for the retailer to counter showrooming by recapturing a retail sale to the showrooming consumer; and
      iii. a software module for identifying a next closest physical retailer outlet participating in a retail sale recapture program.

2. The platform of claim 1, wherein the software module for allowing a consumer to identify at least one retail item identifies an item by one or more of: scanning a bar code, accepting voice input from the consumer, accepting text input from the consumer, capturing a photograph or video, and reading a near field communication (NFC) signal.

3. The platform of claim 1, wherein the software module for querying the retailer queries a discount algorithm preconfigured by the retailer.

4. The platform of claim 3, wherein the discount algorithm comprises: an item, a minimum price, effective dates, effective times, and effective retailer outlet locations.

5. The platform of claim 1, wherein the presented discounted price is acceptable or rejectable by the consumer.

6. The platform of claim 1, wherein the server application further comprises a software module for querying the next closest retailer to offer or decline to offer a discounted price to the consumer, the discounted price dynamically generated based on inputs comprising the at least one retail item, the consumer, and an online price.

7. Non-transitory computer-readable storage media encoded with a computer program including instructions executable by a processor to create a mobile application for recapture of retail sales in showrooming situations comprising:
   a. a software module configured to allow a consumer to identify at least one retail item, the at least one retail item within a physical retailer outlet, wherein identification of the at least one retail item indicates the consumer's intent to showroom the at least one retail item to the retailer;
   b. a software module configured to identify the location of the physical retailer outlet;
   c. a software module configured to query the retailer to offer or decline to offer a discounted price to the consumer, the discounted price dynamically generated based on inputs comprising the at least one retail item and the consumer, the retailer queried being the retailer where the at least one retail item and the consumer are present and that the consumer indicated they intend to showroom, the query consisting essentially of information sent from a server application to the retailer or an entity or individual associated with the retailer without presentation of the query to the consumer;

d. a software module configured to present the discounted price offered by the retailer to the consumer, thereby creating an opportunity for the retailer to counter showrooming by recapturing a retail sale to the showrooming consumer; and e. a software module configured to identify a next closest physical retailer outlet participating in a retail sale recapture program.

8. The media of claim 7, wherein the software module configured to allow a consumer to identify at least one retail item identifies an item by one or more of: scanning a bar code, accepting voice input from the consumer, accepting text input from the consumer, capturing a photograph or video, and reading a near field communication (NFC) signal.

9. The media of claim 7, wherein the software module configured to query the retailer queries a discount algorithm preconfigured by the retailer.

10. The media of claim 9, wherein the discount algorithm comprises: an item, a minimum price, effective dates, effective times, and effective retailer outlet locations.

11. The media of claim 7, wherein the software module configured to present the discounted price to the consumer presents a coupon, coupon code, voucher, or integration with an appropriate back-end retailer process.

12. The media of claim 7, wherein the presented discounted price is acceptable or rejectable by the consumer.

13. The media of claim 7, wherein the application further comprises a software module configured to query the next closest retailer to offer or decline to offer a discounted price to the consumer, the discounted price dynamically generated based on inputs comprising the at least one retail item, the consumer, and an online price.

14. Non-transitory computer-readable storage media encoded with a computer program including instructions executable by a processor to create a server application for recapture of retail sales in showrooming situations comprising:

a. a database, in a computer memory, of retailers and retailer locations;

b. a software module configured to receive location information and identify a physical retailer outlet;

c. a software module configured to receive product information and identify at least one retail item, the at least one retail item within the identified physical retailer outlet;

d. a software module configured to query the retailer to offer or decline to offer a discounted price to the consumer, the discounted price dynamically generated based on an online price, the retailer queried being the retailer where the at least one retail item and the consumer are present and that the consumer indicated they intend to showroom, the query consisting essentially of information sent from the server application to the retailer or an entity or individual associated with the retailer without presentation of the query to the consumer;

e. a software module configured to present the discounted price offered by the retailer to the consumer, wherein receipt of the location and product information indicates a consumer's intent to showroom the at least one retail item to the retailer and presentation of the discounted price creates an opprtunity for the retailer to counter showrooming by recapturing a retail sale to the showrooming consumer; and f. a software module configured to identify a next closest physical retailer outlet participating in a retail sale recapture program.

15. The media of claim 14, wherein the product information is from one or more of: scanning a bar code, voice input from a consumer, text input from a consumer, a photograph or video, and a near field communication (NFC) signal.

16. The media of claim 14, wherein the software module configured to query the retailer queries a discount algorithm preconfigured by the retailer.

17. The media of claim 16, wherein the discount algorithm comprises: an item, a minimum price, effective dates, effective times, and effective retailer outlet locations.

18. The media of claim 14, wherein the software module configured to present the discounted price to the consumer presents a coupon, coupon code, voucher, or integration with an appropriate back-end retailer process.

19. The media of claim 18, wherein the coupon, coupon code, voucher, or integration with an appropriate back-end retailer process is valid for a limited period of time.

20. The media of claim 14, wherein the presented discounted price is acceptable or rejectable by the consumer.

21. The media of claim 14, wherein the application further comprises a software module configured to query the next closest retailer to offer or decline to offer a discounted price to the consumer, the discounted price dynamically generated based on the online price.

22. Non-transitory computer-readable storage media encoded with a discounted price for recapture of retail sales in showrooming situations:

the discounted price being dynamically generated for an individual consumer and for at least one retail item, both the consumer and the at least one retail item within a physical retailer outlet, the discounted price being generated in response to a consumer's intent to showroom the retailer for the at least one retail item; the discounted price derived by querying the retailer where the at least one retail item and the consumer are present and that the consumer intends to showroom to offer or decline to offer a discounted price to the consumer, the query consisting essentially of information sent from the server application to the retailer or an entity or individual associated with the retailer without presentation of the query to the consumer, the discounted price dynamically generated based on inputs comprising the at least one retail item and the consumer to create an opportunity for the retailer to counter showrooming by recapturing a retail sale to the showrooming consumer; the discounted price being valid for a limited period of time, the discounted price in the form of a coupon, coupon code, voucher, or integration with an appropriate back-end retailer process; wherein the discounted price is derived by identifying a next closest physical retailer outlet participating in a retail sale recapture program.

23. The media of claim 22, wherein the discounted price is derived by querying a discount algorithm preconfigured by the retailer.

24. The media of claim 23, wherein the discount algorithm comprises: an item, a minimum price, effective dates, effective times, and effective retailer outlet locations.

25. The media of claim 22, wherein the discounted price is presented to the consumer via a mobile application.

26. The media of claim 22, wherein the discounted price is acceptable or rejectable by the consumer.

27. The media of claim 22, wherein the discounted price is derived by querying the next closest retailer to offer or decline to offer a discounted price to the consumer, the discounted price dynamically generated based on inputs comprising the at least one retail item, the consumer, and an online price.

* * * * *